(12) United States Patent
Sugiyama (10) Patent No.: US 11,554,813 B2
(45) Date of Patent: Jan. 17, 2023

(54) FRONT PILLAR UPPER STRUCTURE

(71) Applicant: FUTABA INDUSTRIAL CO., LTD., Okazaki (JP)

(72) Inventor: Norihiko Sugiyama, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 0 days.

(21) Appl. No.: 17/336,455

(22) Filed: Jun. 2, 2021

(65) Prior Publication Data
US 2021/0387677 A1    Dec. 16, 2021

(30) Foreign Application Priority Data

Jun. 12, 2020 (JP) ............................. JP2020-102535
Mar. 22, 2021 (JP) ............................. JP2021-047444

(51) Int. Cl.
*B62D 25/04* (2006.01)
*B62D 21/15* (2006.01)

(52) U.S. Cl.
CPC ............ *B62D 25/04* (2013.01); *B62D 21/152* (2013.01)

(58) Field of Classification Search
CPC ....... B62D 25/04; B62D 21/15; B62D 21/152
USPC ........................... 296/193.06, 187.09, 187.1
See application file for complete search history.

(56) References Cited

FOREIGN PATENT DOCUMENTS

CN       107428292 B   * 10/2019 ............. B60K 35/00
JP       2012121368 A    6/2012

* cited by examiner

*Primary Examiner* — Dennis H Pedder
(74) *Attorney, Agent, or Firm* — Withrow & Terranova, P.L.L.C.; Vincent K. Gustafson (57) ABSTRACT

A front pillar upper structure of a vehicle includes an outer member and an inner member. The inner member forms an inner wall of the front pillar upper structure in a vehicle-width direction, and is joined to the outer member forming an outer wall in the vehicle-width direction to form a closed cross-section structure. The inner member includes a flange part, a first wall part, and a second wall part. The second wall part is disposed between the flange part located on the lower side of the inner member and joined to the outer member and the first wall part located above the flange part. The second wall part has an angle of inclination in a range from 41° to 68° to a principal axis of inertia extending in the vehicle-width direction in a cross section substantially vertical to a longitudinal direction of the front pillar upper structure.

2 Claims, 5 Drawing Sheets

ANGLE θ[°] BETWEEN PRINCIPAL AXIS OF INERTIA AND SECOND WALL PART
BENDING STRENGTH DIAGRAM (INDEX)

FRONT PILLAR UPPER STRUCTURE

CROSS-REFERENCE TO RELATED APPLICATIONS

This application claims the benefit of Japanese Patent Application No. 2020-102535 filed on Jun. 12, 2020 and Japanese Patent Application No. 2021-47444 filed on Mar. 22, 2021 with the Japan Patent Office, the entire disclosures of which are incorporated herein by reference.

BACKGROUND

The present disclosure relates to a front pillar upper structure.

For collision safety of automobiles, there is a known technique for limiting deformation of frames and the like that form a skeleton of a vehicle body toward the inside of a vehicle when a load acts from the outside of the vehicle.

Japanese Unexamined Patent Application Publication No. 2012-121368 discloses a technique for limiting deformation of a roof side skeleton frame toward the inside of the vehicle by placing a center-of-gravity position of a cross section of a front pillar outside the vehicle against a load applied from above the vehicle to the roof side skeleton frame when the vehicle rolls over.

SUMMARY

Due to the increased performance requirements for collision safety of automobiles, there is a demand for limiting deformation of frames and the like that form a skeleton of a vehicle body toward the inside of the vehicle against a load acting from the front of the vehicle such as, for example, an offset collision and a small overlap collision. Specifically, it is desired to limit deformation of a front pillar to which a load applied in response to a load acting from the front of the vehicle tends to increase.

However, it is unlikely that the technique disclosed in Japanese Unexamined Patent Application Publication No. 2012-121368 can be a measure to limit deformation of the front pillar against the load acting from the front of the vehicle.

In one aspect of the present disclosure, it is preferable to provide a technique for limiting deformation of a front pillar against a load acting from the front of a vehicle.

One embodiment of the present disclosure provides a front pillar upper structure. The front pillar upper structure is a portion of a front pillar extending in a front-rear direction of a vehicle. The front pillar upper structure is located above a front door of the vehicle, and corresponds to a region extending toward a rear of the vehicle to a position intersecting a top of a windshield. The front pillar upper structure comprises an outer member and an inner member. The outer member forms an outer wall of the front pillar upper structure in a vehicle-width direction of the vehicle. The inner member forms an inner wall of the front pillar upper structure in the vehicle-width direction, and is joined to the outer member to form a closed cross-section structure. The inner member comprises a flange part, a first wall part, and a second wall part. The flange part is located on a lower side of the inner member, and is joined to the outer member. The first wall part is located above the flange part. The second wall part is disposed between the flange part and the first wall part. The second wall part has an angle of inclination within a range from 41° to 68° with respect to a principal axis of inertia extending in the vehicle-width direction in a cross section substantially vertical to a longitudinal direction of the front pillar upper structure.

In the configuration as such, due to a moment generated around the principal axis of inertia extending in the vehicle-width direction of the front pillar upper structure, an input load is generated which biases the front pillar in an up-down direction of the vehicle. The angle of inclination is such that the second wall part becomes closer to parallel to an input direction of the input load generated as above. Therefore, as compared to a configuration in which the second wall part has an angle of inclination close to a right angle to the input direction of the input load in the up-down direction generated by the moment, the second wall part has higher strength against the input load, and it becomes difficult for the cross-sectional shape of the front pillar upper structure to be deformed. As a result, the front pillar can have improved cross-section yield strength. Accordingly, deformation of the front pillar against the load acting from the front of the vehicle can be limited.

In one embodiment of the present disclosure, the first wall part and the second wall part may be continuous on an inner side in the vehicle-width direction than the flange part. According to the configuration as such, the front pillar upper structure can have an increased cross-sectional area.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

1. Configuration

1-1. Front Pillar Peripheral Structure

Figure 1:
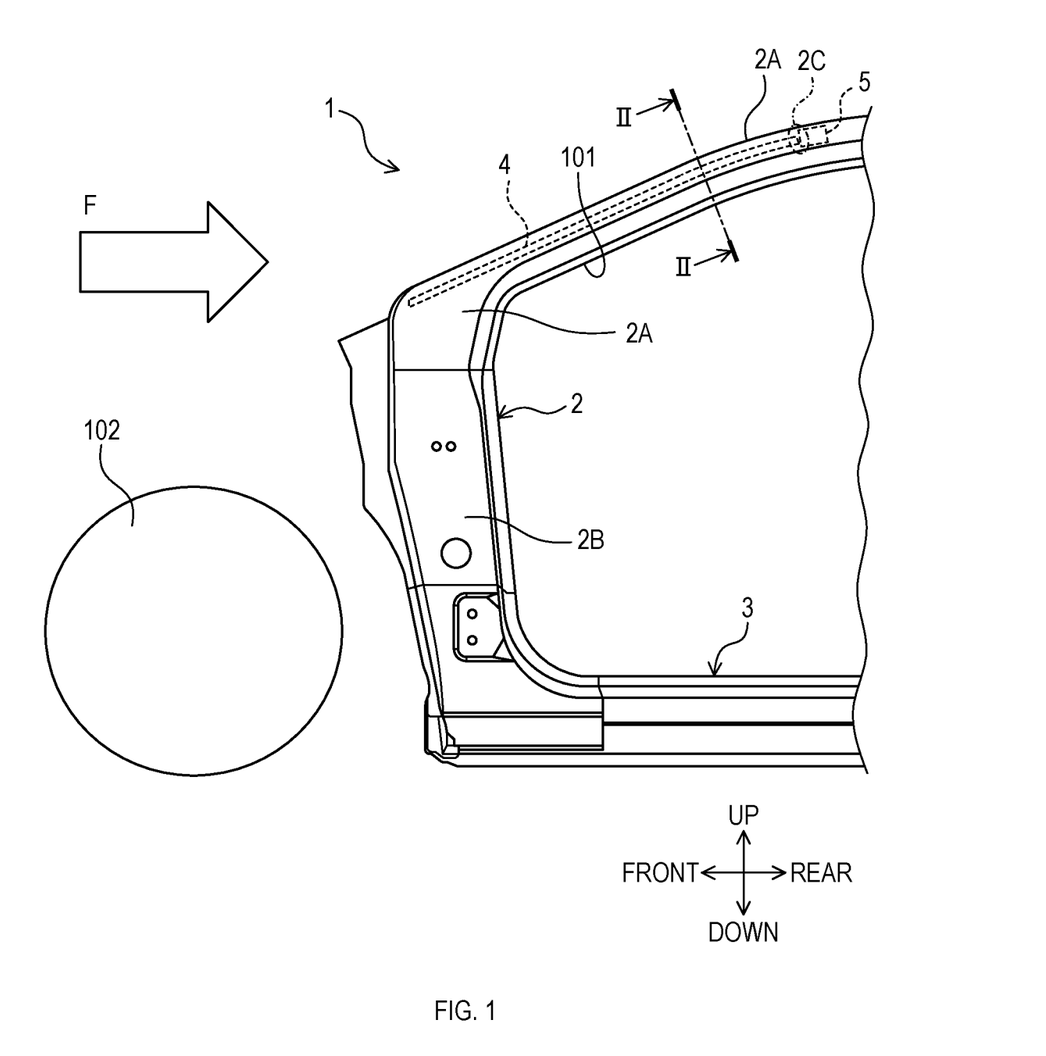
FIG. 1 is a schematic side view showing a peripheral structure of a front pillar.

A front pillar peripheral structure 1 shown in FIG. 1 comprises a front pillar 2 and a locker 3.

The front pillar 2 and the locker 3 form part of a skeleton of the side of a vehicle, and forms an opening 101 to be opened and closed by a front door (not shown) of the vehicle. When the opening 101 is closed by the front door, the inner side and the outer side of the vehicle are partitioned. In front of the front pillar peripheral structure 1, a front wheel 102 of the vehicle is disposed.

The front pillar peripheral structure 1 is provided on both sides in a vehicle-width direction, that is, both left and right sides of the vehicle. FIG. 1 shows the front pillar peripheral structure 1 on the left side of the vehicle. The right side of the vehicle has the same configuration as the left side of the vehicle. Thus, in the following, the configuration of the left side of the vehicle will be described as an example. Also, in the following description, an up-down direction, a front-rear direction, and a right-left direction are expressed based on the vehicle. The right-left direction is also referred to as vehicle-width direction.

The front pillar 2 extends in the up-down direction, and forms a frame on the front side and the upper side of the opening 101. The front pillar 2 has an upper front pillar 2A and a lower front pillar 2B.

The upper front pillar 2A is disposed to extend in the front-rear direction above the opening 101. A windshield 4 is attached to a region surrounded by the upper front pillar 2A and a front header 5 that extends in the vehicle-width direction. In the present embodiment, a region from the front end of the upper front pillar 2A toward the rear of the vehicle to a position 2C intersecting the upper end of the windshield 4 corresponds to a front pillar upper structure. The front end of the upper front pillar 2A is an end of the upper front pillar 2A located on the front side in the front-rear direction of the vehicle. In other words, the front end of the upper front pillar 2A is an end on the side to be coupled to the later-described lower front pillar 2B. The region from the front end of the upper front pillar 2A to the position 2C intersecting the upper end of the windshield 4 is a region from the front end of the upper front pillar 2A to a portion intersecting the front header 5. The region from the front end of the upper front pillar 2A to the position 2C intersecting the upper end of the windshield 4 is more preferably a region from the front end of the upper front pillar 2A to before the portion intersecting the front header 5.

The lower front pillar 2B is disposed between the front wheel 102 and the opening 101, that is, to extend in the up-down direction in front of the opening 101. An upper end of the lower front pillar 2B is coupled to the front end of the upper front pillar 2A.

The locker 3 extends in the front-rear direction, and forms a frame on the lower side of the opening 101. A front end of the locker 3 is joined to a lower end of the front pillar 2, specifically, a lower end of the lower front pillar 2B.

1-2. Upper Front Pillar

Figure 2:
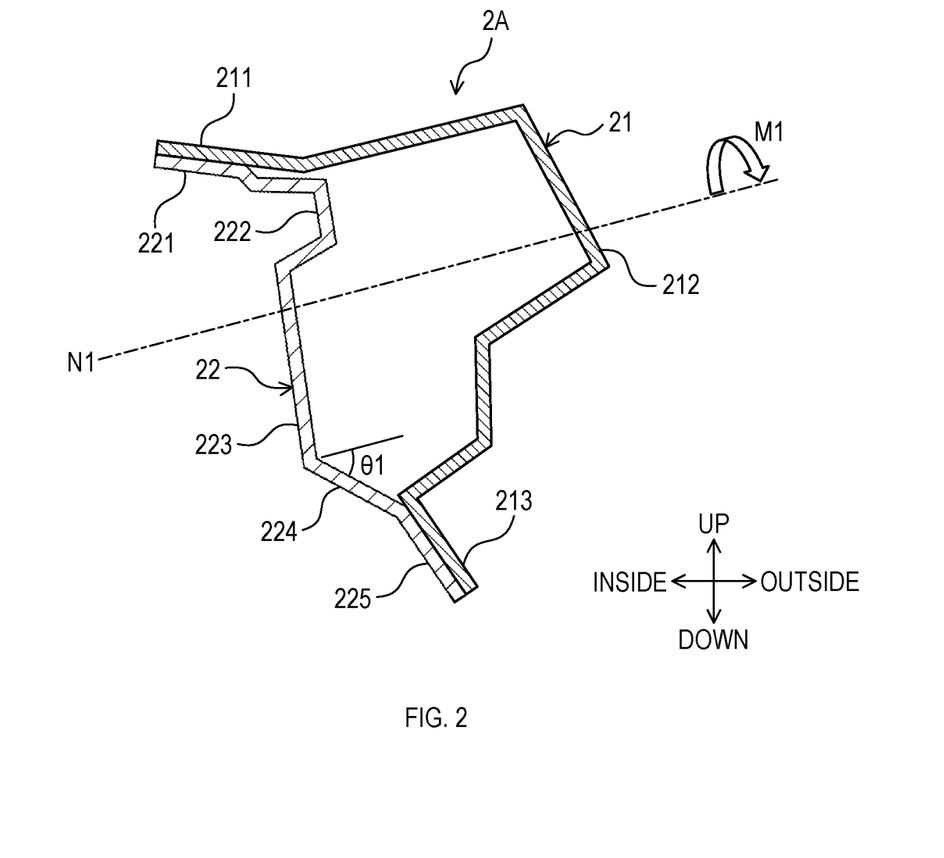
FIG. 2 is an end view schematically showing a portion in FIG. 1 cut along a line II-II.

The upper front pillar 2A will be described with reference to FIG. 2 showing an end face of the upper front pillar 2A in a direction substantially vertical to a longitudinal direction of the upper front pillar 2A.

As shown in FIG. 2, the upper front pillar 2A comprises an outer member 21 and an inner member 22. The outer member 21 and the inner member 22 are joined to each other at opposite ends in the up-down direction to form a closed cross-section structure of the upper front pillar 2A.

The upper front pillar 2A has a principal axis of inertia N1 that extends in the vehicle-width direction into a cross section substantially vertical to the longitudinal direction of the upper front pillar 2A. The principal axis of inertia is an axis defined by a cross-sectional shape of an object, which is an axis of a principal second moment of area. The principal second moment of area is a second moment of area when the object has maximum bending difficulty, or a second moment of area when the object has minimum bending difficulty. An axis of the second moment of area when the object has maximum bending difficulty is orthogonal to an axis of the second moment of area when the object has minimum bending difficulty. In a cross section of an object, there are cases where the principal axis of inertia N1 which is an axis of the second moment of area when the object has maximum bending difficulty is in the same position as a neutral axis which is a line where a neutral surface intersects the cross section. The neutral surface is where no stress occurs when the upper front pillar 2A is bent and deformed.

<Outer Member>

The outer member 21 is disposed outside the vehicle, and forms an outer wall in the vehicle-width direction of the upper front pillar 2A. The outer member 21 is a plate-shaped member extending in the up-down direction and the front-rear direction.

The outer member 21 comprises an upper end flange part 211, an outer wall 212, and a lower end flange part 213.

The upper end flange part 211 of the outer member 21 and the lower end flange part 213 of the outer member 21 are portions to be joined to the inner member 22, for example, by welding.

The upper end flange part 211 of the outer member 21 is a portion located at an upper end of the outer member 21, and extends inward in the vehicle-width direction.

The lower end flange part 213 of the outer member 21 is a portion located at a lower end of the outer member 21, and extends downward.

The outer wall 212 is disposed between the upper end flange part 211 of the outer member 21 and the lower end flange part 213 of the outer member 21, and couples a lower end of the upper end flange part 211 of the outer member 21 and the upper end of the lower end flange part 213 of the outer member 21. The outer wall 212 is formed to project outward in the vehicle-width direction in a step-like manner.

<Inner Member>

The inner member 22 is disposed inside the vehicle, and forms an inner wall in the vehicle-width direction of the upper front pillar 2A. The inner member 22 is also a plate-shaped member extending in the up-down direction and the front-rear direction.

The inner member 22 comprises an upper end flange part 221, a dented part 222, a first wall part 223, a second wall part 224, and a lower end flange part 225. A wire harness and an airbag that inflates and expands in the event of vehicle collision are attached to the inner side of the vehicle than the first wall part 223 of the inner member 22.

The upper end flange part 221 of the inner member 22 and the lower end flange part 225 of the inner member 22 are portions to be joined to the outer member 21, for example, by welding. Specifically, the upper end flange part 221 of the inner member 22 is joined to the upper end flange part 211 of the outer member 21, and the lower end flange part 225 of the inner member 22 is joined to the lower end flange part 213 of the outer member 21.

The upper end flange part 221 of the inner member 22 is a portion located at an upper end of the inner member 22, and extends inward in the vehicle-width direction.

The lower end flange part 225 of the inner member 22 is a portion located at a lower end of the inner member 22, and extends downward.

An end in the vehicle-width direction of the windshield 4 is attached to the upper end flange part 211 of the outer member 21 and the upper end flange part 221 of the inner member 22. Also, a door opening trim (not shown) elastically fits into the lower end flange part 213 of the outer member 21 and the lower end flange part 225 of the inner member 22.

The dented part 222 is disposed between the upper end flange part 221 of the inner member 22 and the first wall part 223. The first wall part 223 is located below the upper end flange part 221 of the inner member 22. The dented part 222 is a portion concaved inward of the cross section of the upper front pillar 2A, that is, a portion projecting outward in the vehicle-width direction.

The first wall part 223 extends straight downward from a lower end of the dented part 222.

The second wall part 224 is disposed between the first wall part 223 and the lower end flange part 225 of the inner member 22. The second wall part 224 extends straight from a lower end of the first wall part 223 to an upper end of the lower end flange part 225 of the inner member 22, and couples the first wall part 223 and the lower end flange part 225 of the inner member 22. The inner member 22 has a ridge line between the second wall part 224 and the lower end flange part 225 of the inner member 22.

The first wall part 223 and the second wall part 224 are continuous to have a ridge line on the inner side in the vehicle-width direction than the lower end flange part 225 of the inner member 22, so that the inner member 22 is projected inward in the vehicle-width direction by the first wall part 223 and the second wall part 224.

The second wall part 224 has an angle of inclination θ within a range from 41° to 68° to the principal axis of inertia N1 extending in the vehicle-width direction in the cross section substantially vertical to the longitudinal direction of the upper front pillar 2A. In an example shown in FIG. 2, the second wall part 224 has an angle of inclination θ1 of 43° as the angle of inclination θ to the principal axis of inertia N1.

2. Operation

For example, as in the event of a small overlap collision, when an impact load F shown in FIG. 1 acts on the front of the vehicle, input of the impact load F is transmitted to the front pillar 2 via an apron member (not shown). The input of the impact load F to the front pillar 2 generates a load moment M1 around the principal axis of inertia N1 of the upper front pillar 2A shown in FIG. 2. This load moment M1 generates an input load which biases the upper front pillar 2A in the up-down direction in the upper front pillar 2A.

When the impact load F acts on the front of the vehicle, a load moment is generated also around a principal axis of inertia vertical to the principal axis of inertia N1 of the upper front pillar 2A. However, the load moment generated around the principal axis of inertia vertical to the principal axis of inertia N1 is sufficiently small as compared to the load moment M1. Therefore, in the present embodiment, only the operation by the load moment M1 will be described.

Figure 3:
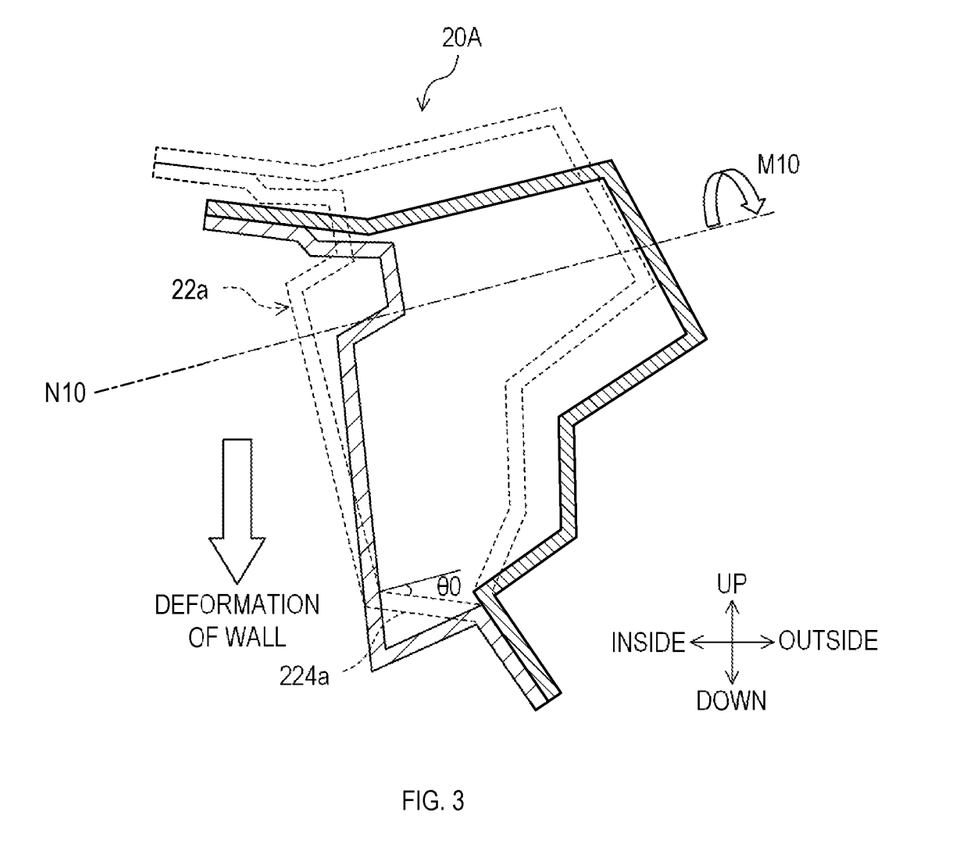
FIG. 3 is an end view schematically showing deformation of a front pillar having a conventional shape against a load acting from the front of a vehicle.

FIG. 3 shows a configuration of a conventional upper front pillar 20A with a broken line. In the conventional upper front pillar 20A as well, the input load that biases the upper front pillar 20A in the up-down direction is generated by a load moment M10 generated around a principal axis of inertia N10 of the upper front pillar 20A. A second wall part 224a of an inner member 22a of the upper front pillar 20A is formed to have an angle of inclination close to a right angle to an input direction of the input load generated as above. In an example shown in FIG. 3, the second wall part 224a has an angle of inclination θ0 of 26° as the angle of inclination θ to the principal axis of inertia N10.

In the configuration as above, the second wall part 224a does not have high strength against the input load that is generated by the load moment M10 and biases the upper front pillar 20A in the up-down direction. Therefore, when the impact load F acts on the front of the vehicle, the second wall part 224a is easily deformed as shown with a solid line in FIG. 3, and a cross section of the upper front pillar 20A is likely to collapse.

On the other hand, the second wall part 224 of the present embodiment has an angle of inclination closer to parallel than the second wall part 224a to the input direction of the input load in the up-down direction generated in the upper front pillar 2A by the load moment M1. Therefore, the second wall part 224 has higher strength against the input load in the up-down direction as compared to the second wall part 224a. Accordingly, when the impact load F acts on the front of the vehicle, the cross section of the upper front pillar 2A is difficult to be deformed, and collapse of the cross section of the upper front pillar 2A is limited.

3. Effect

According to the embodiment detailed in the above, the following effects can be obtained.

(3a) In the present embodiment, due to the load moment M1 generated around the principal axis of inertia N1 of the upper front pillar 2A, the input load is generated which biases the upper front pillar 2A in the up-down direction of the vehicle. To the input direction of the input load generated as such, the second wall part 224 has the angle of inclination getting closer to parallel. Therefore, the second wall part 224 has higher strength against the input load in the up-down direction generated by the load moment M1, as compared to the configuration in which the second wall part has an angle of inclination close to a right angle to the input direction of the input load. Specifically, since the second wall part 224 has a shape that is easier to withstand the input load, the cross section of the upper front pillar 2A is difficult to be deformed.

Here, the effect of the angle of inclination θ to the principal axis of inertia N1 of the second wall part 224 in the inner member 22 of the upper front pillar 2A being in the range from 41° to 68° will be described with reference to FIGS. 4 and 5.

Figure 4:
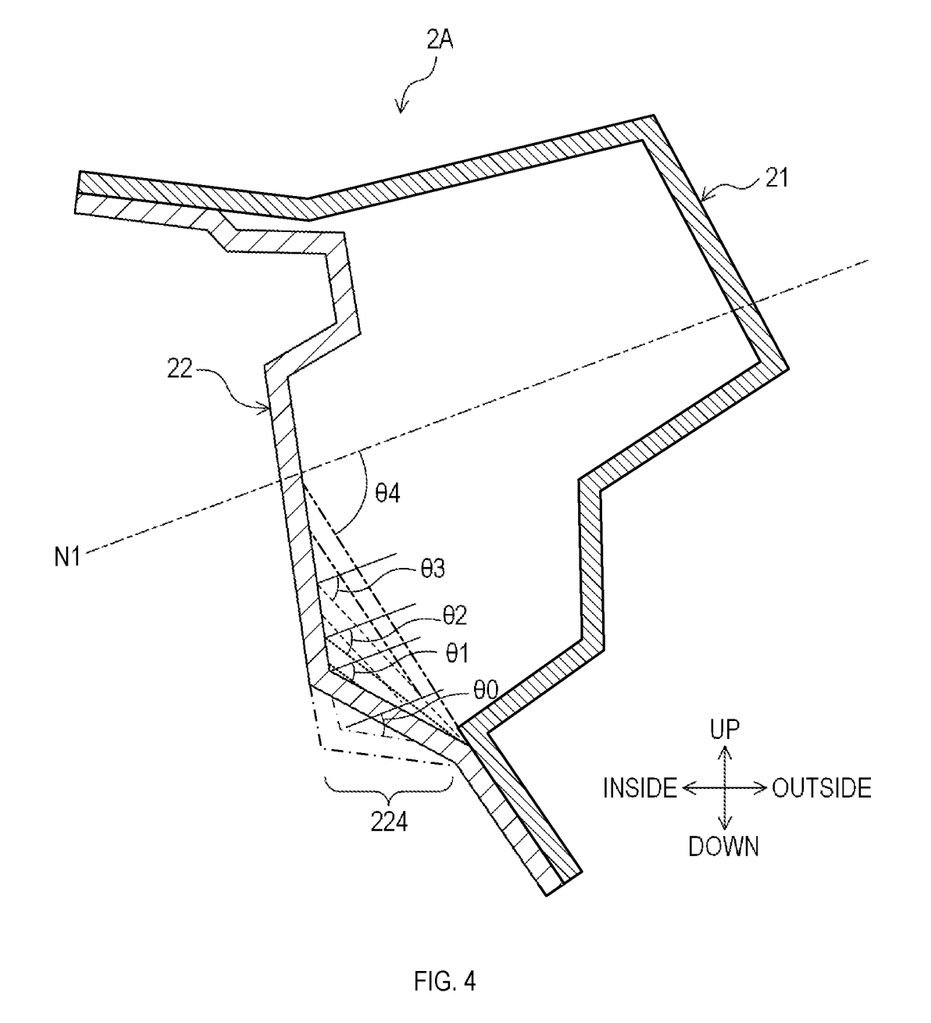
FIG. 4 is an end view schematically showing a front pillar having a different angle of inclination to a principal axis of inertia of a second wall part.

FIG. 4 shows the cross-sectional shape of the upper front pillar 2A when the angle of inclination θ to the principal axis of inertia N1 of the second wall part 224 is θ0 to θ4. The angle of inclination θ0 is 26° which is the same as that of the second wall part 224a of the upper front pillar 20A in the conventional configuration shown in FIG. 3. The angle of inclination θ1 is 43° which is the same as that of the second wall part 224 of the upper front pillar 2A in the present embodiment shown in FIG. 2. The angle of inclination θ2 is 56°, the angle of inclination θ3 is 67°, and the angle of inclination θ4 is 81°.

Figure 5:
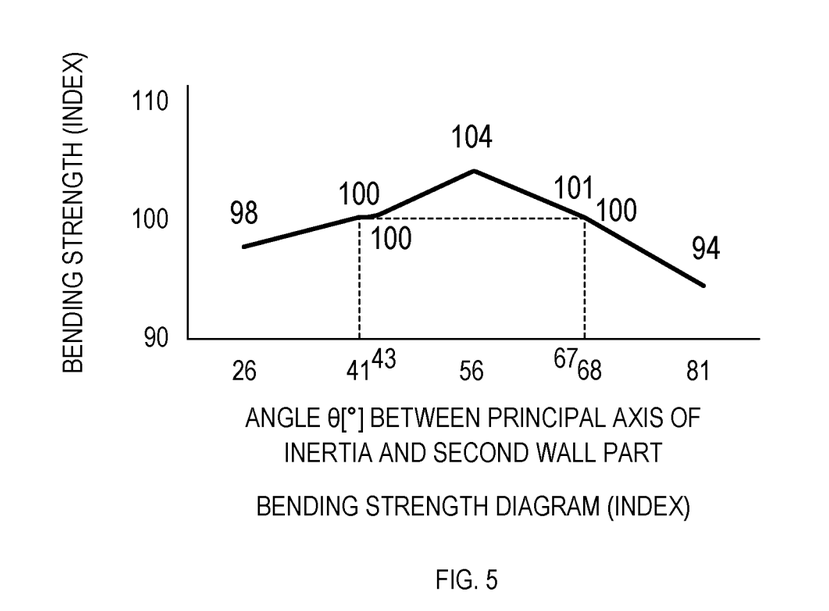
FIG. 5 is a diagram showing exponentially transformed bending strength of the front pillar by each angle of inclination of the second wall part against the load acting from the front of the vehicle.

As shown in FIG. 5, respective bending strengths of the upper front pillar 2A, when angles of inclination θ to the principal axis of inertia N1 of the second wall part 224 are θ0 to θ4, are exponentially transformed so that a value when the angle of inclination θ is 41° is 100. It is confirmed that the bending strengths after the exponential transformation above have results as described below. When the angle of inclination θ is 41°, the bending strength after the exponential transformation is 100. In this case, the bending strength after the exponential transformation in case of the angle of inclination θ0 is 98, the bending strength after the exponential transformation in case of the angle of inclination θ1 is 100, the bending strength after the exponential transformation in case of the angle of inclination θ2 is 104, the bending strength after the exponential transformation in case of the angle of inclination θ3 is 101, and the bending strength after the exponential transformation in case of the angle of inclination θ4 is 94.

As shown in FIG. 5, the bending strength of the upper front pillar 2A tends to increase when the angle of inclination θ of the second wall part 224 to the principal axis of inertia N1 is larger than a reference of 26°, which is the same angle of inclination θ0 as that of the conventional configuration shown in FIG. 3. However, when the angle of inclination θ to the principal axis of inertia N1 of the second wall part 224 is equal to or more than 68°, the bending strength of the upper front pillar 2A tends to decrease as compared to the case where the angle of inclination θ is 41°. Thus, when the angle of inclination θ is larger than 41° and less than 68°, the bending strength of the upper front pillar 2A is improved as compared to the case where the angle of inclination θ0 is 26°. Specifically, when the angle of inclination θ is in a range from 42° to 56°, the bending strength of the upper front pillar 2A tends to increase as the angle of inclination increases. Also, when the angle of inclination θ is in a range from 57° to 67°, the bending strength of the upper front pillar 2A tends to decrease as the angle of inclination increases. However, the bending strength of the upper front pillar 2A is larger in that range than in the case where the angle of inclination θ0 is 26°. It is assumed that the reason why the bending strength of the upper front pillar 2A tends to decrease when the angle of inclination θ is in the range from 57° to 67° is because angle difference around the ridge line between the second wall part 224 and the lower end flange part 225 is reduced.

The second wall part 224 of the present embodiment has the angle of inclination θ1 of 43° to the principal axis of inertia N1 of the upper front pillar 2A. As shown in FIG. 5, when the angle of inclination θ to the principal axis of inertia N1 of the second wall part 224 is in the range from 41° to 68°, the bending strength of the upper front pillar 2A becomes larger than the case where the angle of inclination θ0 to the principal axis of inertia N1 of the second wall part 224 is 26°. Therefore, cross-section yield strength of the upper front pillar 2A can be improved. Accordingly, deformation of the front pillar 2 against the impact load F acting from the front of the vehicle can be limited. As a result, while equivalent crash performance to the impact load F acting from the front of the vehicle is secured, weight reduction of the vehicle, such as decrease in plate thickness of the front pillar 2, can be achieved.

(3b) In the present embodiment, by changing the inclination to the principal axis of inertia N1 of the second wall part 224 that forms the upper front pillar 2A, that is, without largely changing the cross-sectional shape of the upper front pillar 2A, cross-section yield strength of the upper front pillar 2A can be improved. Thus, as compared to a configuration in which the cross-sectional shape of the upper front pillar is largely changed, impact on peripheral parts of the upper front pillar 2A can be reduced.

(3c) In the present embodiment, the first wall part 223 and the second wall part 224 are continuous on the inner side in the vehicle-width direction than the lower end flange part 225. Therefore, the upper front pillar 2A can have an increased cross-sectional area.

4. Other Embodiments

While an embodiment of the present disclosure has been described above, the present disclosure is not limited to the above-described embodiment, and can be implemented in variously modified forms.

(4a) The angle of inclination θ to the principal axis of inertia N1 of the second wall part 224 is not limited to the range from 41° to 68°. For example, the angle of inclination θ may be in a different range within the range from 41° to 68°. Specifically, for example, the angle of inclination θ may be in a further limited range within the aforementioned numerical range. For example, the angle of inclination θ is preferably equal to or more than 43°, and more preferably equal to or more than 50°. Also, for example, the angle of inclination θ is preferably equal to or less than 65°, and more preferably equal to or less than 60°.

(4b) In the aforementioned embodiment, the outer wall 212 of the outer member 21 protrudes outward in the vehicle-width direction in a step-like manner. The outer wall 212 is not limited to this shape and may have various shapes.

(4c) In the aforementioned embodiment, the second wall part 224 couples the first wall part 223 and the lower end flange part 225. However, the second wall part 224 does not have to be directly continuous with the first wall part 223. Specifically, there may be other element between the second wall part 224 and the first wall part 223.

(4d) The front pillar upper structure is not limited to the entire region from the front end of the upper front pillar 2A to the position 2C intersecting the upper end of the windshield 4. For example, the front pillar upper structure may be a further limited region within the region from the front end of the upper front pillar 2A to the position 2C intersecting the upper end of the windshield 4.

(4e) A function performed by a single element in the above-described embodiment may be achieved by a plurality of elements, or a function performed by a plurality of elements may be achieved by a single element. Also, a part of a configuration of the above-described embodiment may be omitted. Further, at least a part of a configuration of the above-described embodiment may be added to, or may replace, other configuration of the above-described embodiment. Any form included in the technical idea defined by the language of the claims may be an embodiment of the present disclosure.

What is claimed is:

1. A front pillar upper structure that is a portion of a front pillar extending in a front-rear direction of a vehicle, the front pillar upper structure being located above a front door of the vehicle, and corresponding to a region extending toward a rear of the vehicle to a position intersecting a top of a windshield, the front pillar upper structure comprising:
an outer member that forms an outer wall of the front pillar upper structure in a vehicle-width direction of the vehicle; and
an inner member that forms an inner wall of the front pillar upper structure in the vehicle-width direction, and is joined to the outer member to form a closed cross-section structure,
the inner member comprising:
a flange part located on a lower side of the inner member, and joined to the outer member;
a first wall part located above the flange part; and
a second wall part disposed between the flange part and the first wall part,
the second wall part having an angle of inclination in a range from 41° to 68° to a principal axis of inertia extending in the vehicle-width direction in a cross section substantially vertical to a longitudinal direction of the front pillar upper structure, and
the principal axis of inertia being an axis defined by a cross-sectional shape of the front pillar upper structure, which is an axis of a second moment of area when the front pillar upper structure has maximum bending difficulty, or an axis of a second moment of area when the front pillar upper structure has minimum bending difficulty.

2. The front pillar upper structure according to claim 1, wherein the first wall part and the second wall part are continuous on an inner side in the vehicle-width direction than the flange part.

* * * * *